United States Patent [19]

Harig

[11] 4,380,110

[45] Apr. 19, 1983

[54] METHOD OF FORMING A MITERED JOINT

[75] Inventor: Robert G. Harig, Paragould, Ark.

[73] Assignee: Darling Store Fixtures, Paragould, Ark.

[21] Appl. No.: 209,909

[22] Filed: Nov. 24, 1980

[51] Int. Cl.³ .............................................. B23P 19/02
[52] U.S. Cl. ...................................... 29/525; 228/142; 228/160; 228/170; 403/270; 403/401
[58] Field of Search .................. 29/525; 403/401, 270, 403/402, 271, 272; 228/142, 120, 160, 170

[56] References Cited

U.S. PATENT DOCUMENTS

| 1,524,261 | 1/1925 | Kusterle | 403/401 X |
|---|---|---|---|
| 1,817,162 | 8/1931 | Mulligan | 403/401 X |
| 1,832,078 | 11/1931 | Zahner et al. | 189/76 |
| 1,984,172 | 12/1934 | Brownley | 403/270 X |
| 2,242,427 | 5/1941 | Heanue | 403/272 X |
| 2,654,451 | 10/1953 | Schmidgal | 189/76 |
| 2,978,874 | 4/1961 | Baittinger | 403/271 X |
| 3,200,913 | 8/1965 | Nelson | 189/36 |
| 3,435,511 | 4/1969 | Cooper et al. | 228/142 |
| 3,467,423 | 9/1969 | Schlegel, Jr. et al. | 403/270 |
| 3,534,490 | 10/1970 | Herbert | 40/155 |
| 3,829,226 | 8/1975 | Kreusel | 403/295 |
| 3,899,258 | 8/1975 | Matthews | 403/401 X |
| 4,090,799 | 5/1978 | Crotti et al. | 403/401 |
| 4,205,470 | 6/1980 | Kapnek | 40/155 |
| 4,222,209 | 9/1980 | Peterson | 403/401 X |
| 4,240,765 | 12/1980 | Offterdinger | 403/402 |

FOREIGN PATENT DOCUMENTS

| 570357 | 8/1958 | Belgium | 403/402 |
|---|---|---|---|
| 1128601 | 9/1968 | United Kingdom | 403/402 |

Primary Examiner—Charlie T. Moon
Attorney, Agent, or Firm—Emch, Schaffer & Schaub

[57] ABSTRACT

An improved mitered joint construction for connecting together mitered ends of two tubular members. One leg of an angled insert having two legs is welded to the interior of one of the tubular members and the other insert leg is trimmed and pressed into the other tubular member to hold the members at a desired angle. The members are then welded together only along the inside edge of the joint. For tubular members having a square cross section, two of the inserts hold the members together at the joint.

3 Claims, 7 Drawing Figures

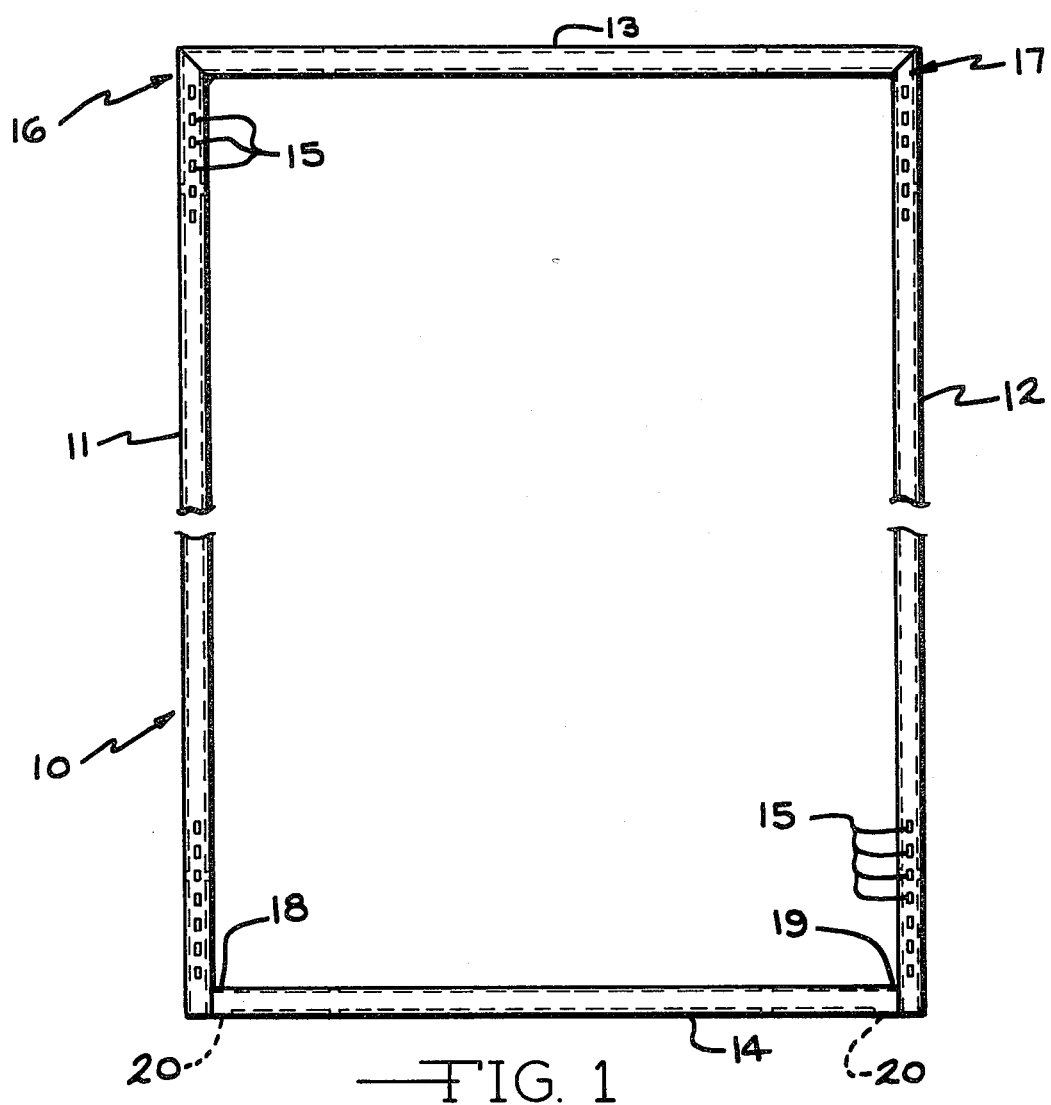
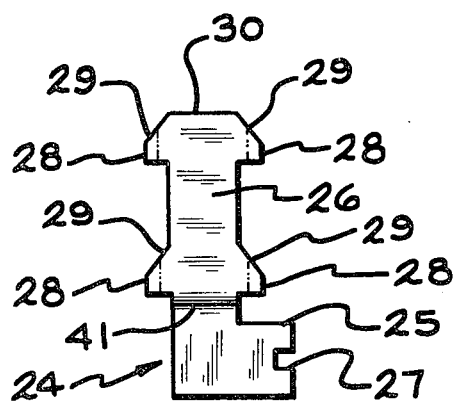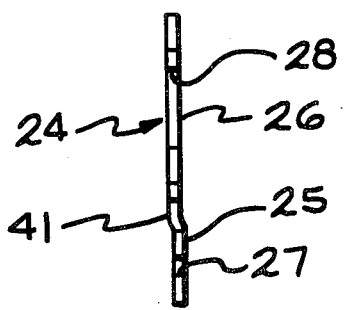

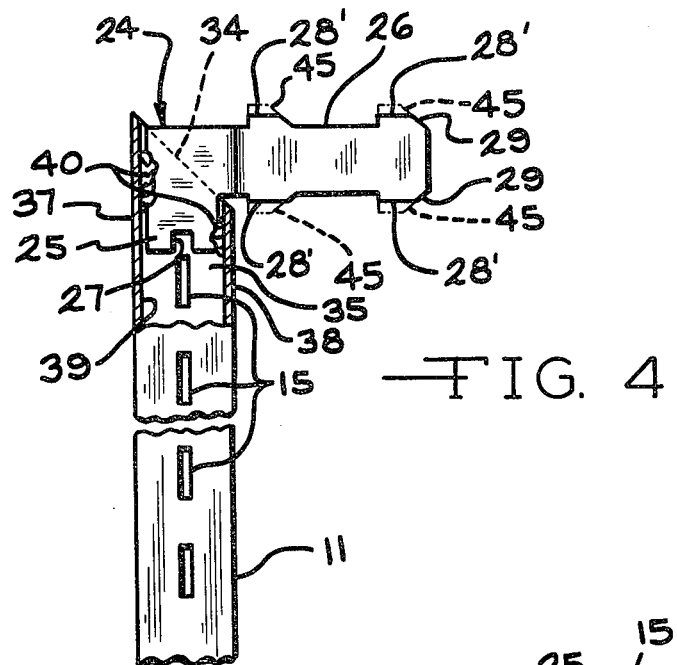
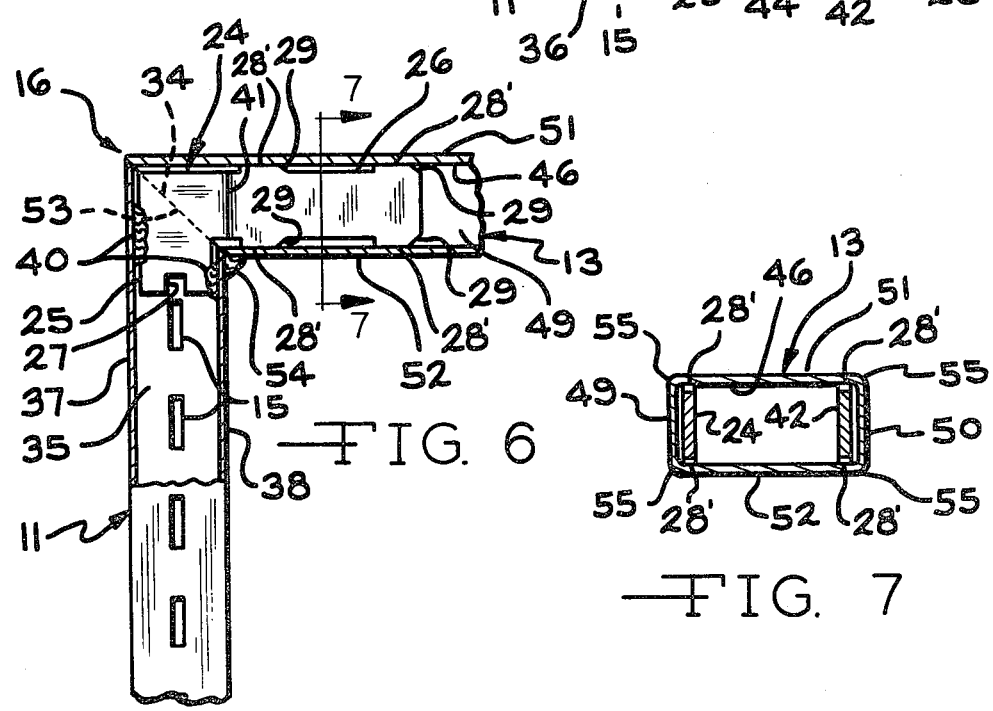

METHOD OF FARMING A MITERED JOINT

BACKGROUND OF THE INVENTION

This invention relates to joints and connections and more particularly to an improved mitered joint construction and a method for forming such a joint in which the ends of tubular members are joined by both an angled insert and by welding along the inside of the joint.

In manufacturing various products, it is often necessary to form an angled or mitered connection between channels and tubular members. In many applications, such as constructing picture frames from extruded aluminum channel, the connection is not subjected to large forces. One common method for forming 90° connections between mitered ends of picture frame channels is to place an angled insert having two legs disposed 90° apart into the mitered ends of two channels and attaching the insert to the channels with screws. Such a joint construction works quite well for picture frames which support only limited weight. However, this type of joint construction has not been acceptable for many applications subjected to higher forces.

Store display fixtures often are constructed from tubular members having either rectangular or round cross sections. For example, one common display fixture has rectangular uprights connected by rectangular horizontal members. The uprights have a number of vertically spaced slots for receiving shelf support brackets. Mitered joints are often formed between horizontal tubular members and uprights for a neat appearance. Since both the horizontal members and the uprights may be subjected to high forces in store display fixtures, it is necessary to have a strong rigid joint between these members. It is also desirable to have a mitered joint which has a tight look at all times. In the past, the normal method for forming the connections have been to miter or bevel the ends of the horizontal and vertical members and to butt and weld the mitered ends together. For appearance sake, it then was necessary to grind the weld smooth with the surfaces of the tubular members and then to polish the surfaces. Depending upon the finish desired, the tubular members are sometimes painted or plated after they were welded together and the weld is ground smooth. This construction is very strong. However, this joint construction is quite expensive and time consuming to manufacture.

SUMMARY OF THE INVENTION

The present invention is directed to a mitered joint construction and a method for forming mitered joints between tubular members. The ends of two members to be joined are mitered or beveled at one half the final angle for the joint. The ends of the members are connected together with an insert having two legs which are angled from one another at the same angle as the final joint. One of the legs is inserted into one of the tubular members adjacent its mitered end and are welded to the interior of such tubular member. Where the tubular members have a rectangular cross section, two inserts are welded to the interior of the tubular member to extend parallel to one another and to abut opposite sides of the rectangular member. The projecting legs of the one or more inserts then are trimmed for an interference fit with the interior of the other tubular member and also to hold the other tubular member at a precise angle for forming the joint. The trimmed end of the insert then is pressed into the interior of the other tubular member until the mitered ends of the two tubular members butt and form a tight joint. The two tubular members finally are welded together along the inside edge of the joint to complete the joint construction. Through this construction, a tight joint is formed holding the two members rigidly together. The mitered joint construction eliminates the need for welding the exposed sides of the joint together and the subsequent need for grinding the welds smooth to provide a commercially acceptable finish. By eliminating the welding and grinding operations around the exposed sides of the mitered joint, the cost of manufacturing the joint is reduced without adversely affecting the strength of the joint for commercial applications, such as for store display fixtures.

Accordingly, it is an object of the invention to provide an improved mitered joint construction for connecting tubular members.

Another object of the invention is to provide an improved method for forming mitered joints between tubular members.

Other objects and advantages of the invention will become apparent from the following detailed description, with reference being made to the accompanying drawings.

BRIEF DESCRIPTION OF THE DRAWINGS

FIG. 1 is a side elevational view of a slotted frame for use in a store display fixture and having mitered joints formed in accordance with the present invention;

FIG. 2 is a side elevational view of an insert used for forming the joint construction of the present invention;

FIG. 3 is an edge elevational view of the insert of FIG. 2;

FIG. 4 is a partially broken away side elevational view showing the attachment of the insert to one of the hollow tubular members for forming the joint construction of the present invention;

FIG. 5 is a top plan view of the partial joint construction shown in FIG. 4;

FIG. 6 is a partially broken away side elevational view showing a completed mitered joint constructed in accordance with the present invention; and FIG. 7 is a cross-sectional view taken along line 7—7 of FIG. 6.

DESCRIPTION OF THE PREFERRED EMBODIMENTS

Turning now to the drawings and particularly to FIG. 1, a frame 10 is shown for use in a store display fixture. The frame 10 includes two vertical slotted uprights 11 and 12 which are connected together by a top horizontal member 13 and a bottom horizontal member 14. The uprights 11 and 12 and the members 13 and 14 are tubular and have rectangular cross sections. The uprights 11 and 12 each have a plurality of vertically spaced slots 15 adapted to receive, for example, standard shelf supporting brackets (not shown). The upright 11 is connected to the upright 13 by a 90° mitered joint 16 constructed in accordance with the present invention and the upright 12 is connected to the horizontal member 13 by a 90° mitered joint 17 constructed in accordance with the present invention. Opposite ends 18 and 19 of the lower horizontal member 14 are butted against the uprights 11 and 12. The ends 18 and 19 are then internally welded to the uprights 11 and 12 through two bottom openings 20 in the horizontal member 14. The connections between the lower horizontal member 14 and the uprights 11 and 12 need not be mitered for appearance purposes and also, by omitting the mitered connections, the bottoms of the tubular uprights 11 and 12 are left open for attaching the frame 10 to a suitable base support (not shown).

Turning now to FIGS. 2 and 3, an insert 24 is shown for use in forming the mitered joints 16 and 17 in accordance with the present invention. The insert 24 has a short leg 25 and a longer leg 26 which are angled 90° apart for the joints 16 and 17. If the mitered joint is to connect tubular members at some other predetermined angle, then the legs 25 and 26 will be disposed at this angle. The leg 25 is designed for insertion into the upright 11 or 12 and may have an end notch 27 to provide clearance around the uppermost notch 15 on the attached upright 11 or 12 so as not to interfere with the insertion of a bracket into such notch 15. The leg 26 is provided with a plurality of pairs of projections 28, of which four projections 28 are shown in the exemplary insert 24. Each of the projections 28 has a beveled edge 29 on the edge facing a free end 30 of the leg 26. The beveled edges 29 facilitate inserting the leg 26 into the horizontal member 13, as is discussed in greater detail below.

FIGS. 4-7 illustrate the construction of the mitered joint 16 between the upright 11 and the horizontal member 13. The mitered joint 17 is constructed in a similar manner. As illustrated in FIG. 4, the upright 11 has a beveled mitered end 34 which is cut at a 45° angle to the longitudinal dimension of the upright 11 since the joint 16 has a 90° angle. The upright 11 is generally rectangular in cross section and has two opposing sides 35 and 36 in which the vertically spaced slots 15 are formed, has an outer side 37 and an inner side 38. The insert 24 is initially positioned with the short leg 25 extending through the mitered end 34 to the interior 39 of the upright 11 and with the leg 25 abutting the upright side 35. The leg 25 is oriented so that the leg 24 extends substantially perpendicular from the upright 11 and the leg 25 is arc welded at 40 to the interior 39 of the upright 11. As best seen in FIGS. 3 and 5, the insert 24 is provided with an offset 41 which spaces the insert leg 25 generally parallel to but inwardly from the insert leg 26. A second insert 42 is attached against the upright side 36 by arc welding at the points 43. The insert 42 is spaced from and extends parallel with the insert 24. The insert 42 is identical to the insert 24 except that it is provided with an offset 44 in an opposite direction from the offset 41 in the insert 24.

The projections 28 on the inserts 24 and 42 are formed oversized so as to project outwardly at a distance greater than that required for attachment to the horizontal member 13. After the inserts 24 and 42 are welded to the upright 11, the projections 28 are trimmed by removing excess metal 45. The projections 28 are trimmed so that the legs 26 of the inserts 24 and 42 extend precisely perpendicular to the slotted upright 11. The dimensions between the opposing trimmed projections 28′ on the insert leg 26 are such as to form an interference fit with an interior 46 of the horizontal member 13.

The horizontal member 13 has two sides 49 and 50, an outer side 51 and an inner side 52. The horizontal member 13 also has a mitered or beveled end 53 which forms an angle of 45° to the longitudinal direction of the member 13 when the joint 16 is formed at a 90° angle. For joints having a different predetermined angle, the individual tubular member ends are mitered at one-half of the predetermined angle. After the inserts 24 and 42 are attached to the slotted upright 11 and the projections 28 are trimmed, the insert legs 26 are passed through the mitered end 53 and pressed into the interior 46 of the horizontal member 13 until the mitered end 53 on the horizontal member 13 butts against the mitered end 34 on the slotted upright 11. The inserts 24 and 42 hold the horizontal member 13 at precisely 90° to the slotted upright 11 and hold the joint 16 together due to the interference fit between the insert legs 26 and the member 13. In order to prevent high forces on the frame 11 from subsequently separating the mitered joint 16, a short arc weld 54 is placed along the inside of the joint 16 to fuse together the inner side 38 of the slotted upright 11 and the inner side 52 of the horizontal member 13. The weld 54 maintains a neat, tight joint 16, even though the frame 10 may be subjected to heavy loading forces.

Referring to FIGS. 5 and 7, it has previously been stated that the insert 24 has an offset 41 and the insert 42 has an offset 44 spacing the legs 26 inwardly from the legs 25. This spacing allows the legs 26 to fit into the interior 46 of the horizontal member 13 without interference with bend radiuses 55 between the adjoining sides 49 and 51, 50 and 51, 50 and 52, and 49 and 52 of the horizontal member 13. In the event that the corners between the adjoining sides on the interior 46 of the horizontal member 13 are sharp, the offsets 41 and 44 may be eliminated from the inserts 24 and 42.

The mitered joint construction of the present invention has been illustrated for the joints 16 and 17 in the frame 10 having slotted uprights 11 and 12 and horizontal members 13 and 14 with rectangular cross sections. It will be appreciated that the present invention may be adapted to forming mitered joints between tubular members having other cross sections, for example, a round cross section. In the event that the mitered joint construction is used with tubular members having a round cross section, only a single insert will be used for forming the joint. In addition to the single insert, the round members are connected together with a short weld along the inside of the joint.

The insert 24 has been described as being initially formed oversize and the projections 28 are trimmed after attaching the insert to one of the tubular members. It will be appreciated that this trimming step may be eliminated by manufacturing the insert to its final dimensions. However, the insert then must be accurately positioned when welding to the inside of the first of the tubular members. Various other changes and modifications also may be made to the above described mitered joint construction without departing from the spirit and scope of the following claims.

What I claim is:

1. A method for forming a mitered joint between ends of two tubular members, said joint connecting said members at a predetermined angle, comprising the steps of:
    (1) shaping the end of each member to extend at an angle of one half of the predetermined angle;
    (2) connecting one leg of an insert having two legs extending at said predetermined angle to the interior of one of said members with the other insert leg extending from said end of said one member said other insert leg having at least one projection extending from the side of said other leg, said projection disposed for engaging the interior of the other of said members;

(3) trimming said projection on said other insert leg to align said other insert leg for forming said joint and to insure an interference fit between said other insert leg and said other member;

(4) pressing said end of the other of said members onto said other insert leg until said member ends abut and said members form a joint extending at the predetermined angle, said other insert leg creating an interference fit with said other member to maintain said other member in position for forming said mitered joint, said abutting ends defining a line extending around said members and including inner and outer portions; and (5) welding said members ends together only along the inner portion of the line between said abutting ends.

2. A method for forming a mitered joint, as set forth in claim 1, and wherein said one insert leg is connected to the interior of said one member by welding.

3. A method for forming a mitered joint, as set forth in claim 1, and wherein said one leg of each of a plurality of said inserts is connected to the interior of said one member by welding, and wherein said other member end is pressed onto said other legs of all of said inserts.

* * * * *